(12) United States Patent
Chang

(10) Patent No.: US 7,467,315 B2
(45) Date of Patent: Dec. 16, 2008

(54) METHOD FOR ENABLING POWER-SAVING MODE

(75) Inventor: Yu-Wei Chang, Taipei (TW)

(73) Assignee: Via Technologies, Inc., Taipei (TW)

( * ) Notice: Subject to any disclaimer, the term of this patent is extended or adjusted under 35 U.S.C. 154(b) by 464 days.

(21) Appl. No.: 11/270,810

(22) Filed: Nov. 9, 2005

(65) Prior Publication Data

US 2006/0112289 A1 May 25, 2006

Related U.S. Application Data

(63) Continuation-in-part of application No. 10/290,131, filed on Nov. 7, 2002, now abandoned.

(51) Int. Cl.
*G06F 1/32* (2006.01)

(52) U.S. Cl. .................. 713/323; 713/322; 713/320

(58) Field of Classification Search .................. 713/300, 713/320, 323, 324
See application file for complete search history.

(56) References Cited

U.S. PATENT DOCUMENTS

| | | | |
|---|---|---|---|
| 4,980,836 A | 12/1990 | Carter | |
| 6,073,244 A * | 6/2000 | Iwazaki | 713/322 |
| 6,125,450 A | 9/2000 | Kardach | |
| 6,169,746 B1 | 1/2001 | Ueda et al. | |
| 6,604,201 B1 * | 8/2003 | Takahashi et al. | 713/323 |
| 6,760,852 B1 | 7/2004 | Gulick | |
| 2004/0017598 A1 | 1/2004 | Seki et al. | |

* cited by examiner

*Primary Examiner*—Chun Cao
(74) *Attorney, Agent, or Firm*—Kirton & McConkie; Evan R. Witt

(57) ABSTRACT

In a method for enabling a power-saving mode for an electronic apparatus, a power mode index Ips is determined according to transmission indices Bit0~Bitn and/or port situation indices Ip0~Ipm. For example, when the transmission indices Bit0~Bitn are all under inactive states or when all the port situation indices Ip0~Ipm are under disable states, the power mode index Ips indicates a highly power-saving mode D3. When less transmission indices are under inactive states or when less port situation indices Ip0~Ipm are under port disable states, the power mode index Ips indicates a primary or intermediate power-saving mode D1 or D2. The power mode index Ips can also indicate no power-saving mode D0 when all transmission indices and/or port situation indices are active/enabled or the electronic apparatus is forced to remain normal power.

13 Claims, 11 Drawing Sheets

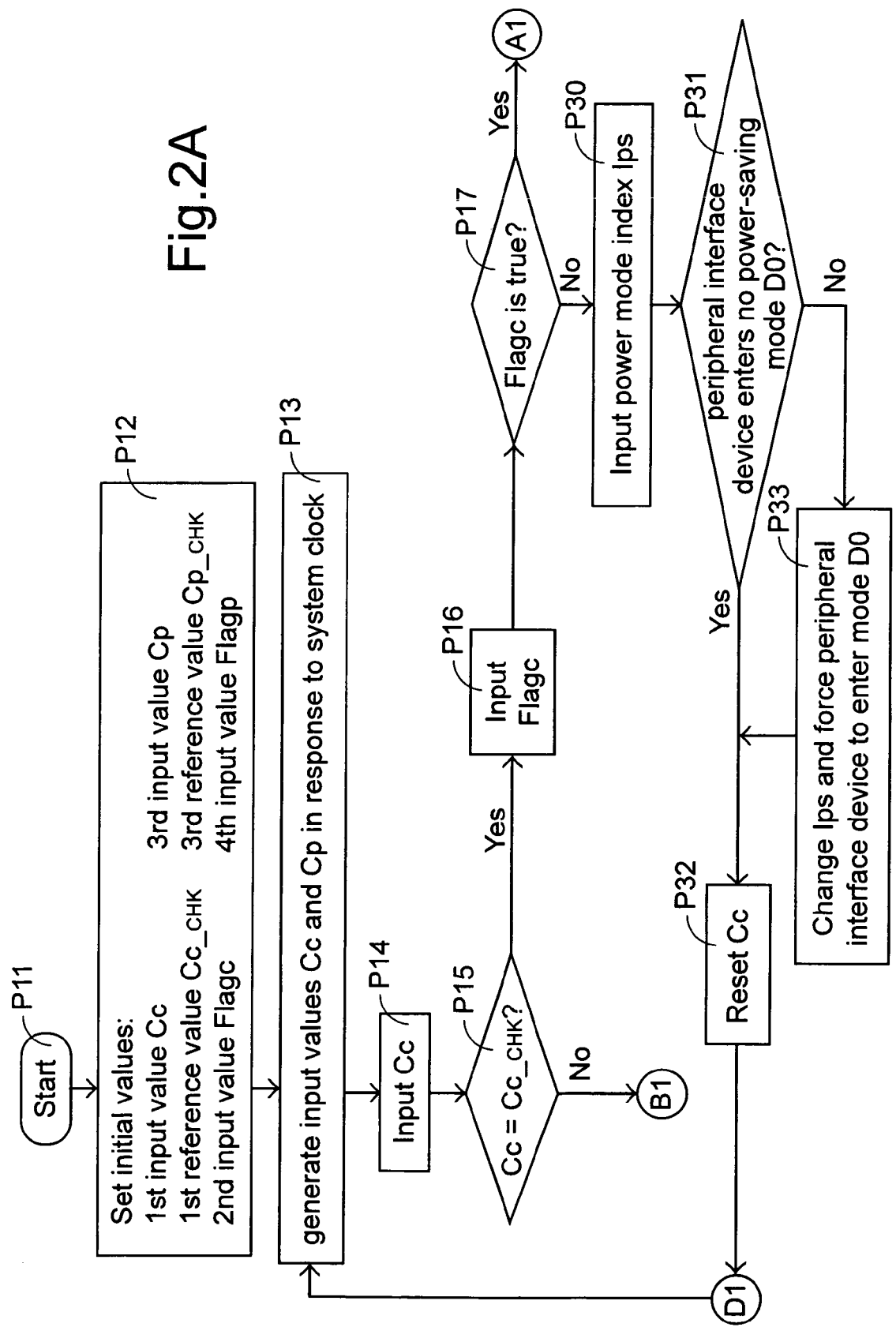

METHOD FOR ENABLING POWER-SAVING MODE

CROSS REFERENCE TO RELATED PATENT APPLICATION

This application is a continuation-in-part (CIP) application of application Ser. No. 10/290,131, filed Nov. 7, 2002, now abandoned the contents of which are incorporated herein by reference.

FIELD OF THE INVENTION

The present invention relates to a method for enabling a power-saving mode, and more particularly to a method for enabling a power-saving mode of a peripheral interface device.

With the increasing number of peripheral devices connected thereto, the power consumption of an electronic apparatus increases. Especially for a portable electronic apparatus, e.g. a portable computer or a cellular phone, a battery which has limited power capacity is generally used as the power source. Therefore, it is an important issue to prolong the standby period of the battery.

For example, a notebook computer is expandable by connecting thereto various peripheral devices via a peripheral interface device, such as IEEE 1394 interface card, with a plurality of expansion I/O ports. It is apparent that the power consumption of the notebook computer increases with the expansion functions applied thereto. Thus, the standby period of the battery decreases accordingly.

Therefore, the present invention is developed to deal with the above situations encountered in the prior art.

SUMMARY OF THE INVENTION

An object of the present invention is to provide a method for reducing the power consumption of an electronic apparatus by allowing the electronic apparatus to enter a power-saving mode at proper timing.

Another object of the present invention is to provide a method for prolonging the standby period of a portable electronic apparatus by allowing the portable electronic apparatus to enter a power-saving mode when the peripheral interface device is not under a data-transceiving state.

According to an aspect of the present invention, there is provided a method for enabling a power-saving mode for an electronic apparatus. The electronic apparatus is electrically connected to a peripheral device via a peripheral interface device. The method includes steps of comparing a first input value with a first reference value; determining each transmission index in a group according to a plurality of transmission-state bits in response to a specified comparing result of the first input value and the first reference value, wherein the transmission index indicates either an inactive transmission state or an active transmission state; and having the peripheral interface device enter a first power-saving mode when each the transmission index in the group indicates an inactive transmission state, and enter a second power-saving mode when there is a certain portion of transmission indices in the group indicate the active transmission mode.

In an embodiment, the transmission index indicates the inactive transmission state when all the transmission-state bits are in disable states, and indicates the active transmission state when at least one of the transmission-state bits are in an enable state.

In an embodiment, the first input value is a constant counting value generated in response to a system clock.

In an embodiment, the transmission indices indicate active or inactive transmission states in asynchronous request transmit mode, asynchronous response transmit mode, asynchronous request receive mode, asynchronous response receive mode, isochronous transmit mode and isochronous receive mode.

In the method, the first input value is reset when the peripheral interface device enters the first or second power-saving mode.

In an embodiment, the transmission indices in the group are determined when the comparing result indicates that the first input value is consistent with the first reference value. On the other hand, the first input value is updated and the comparing step is repeated when the comparing result indicates that the first input value is not consistent with the first reference value.

Preferably, a status of a second input value is detected when the first input value is consistent with the first reference value; and the peripheral interface device is inhibited from entering any of the first power-saving mode and the second power-saving mode when the second input value is in a specified status. The second input value is, for example, a flag and the specified status is one of a true and a false status.

In the method, a third input value is compared with a third reference value when the first input value is different from the first reference value. A port disable mode of a port situation index is determined when the third input value is consistent with the third reference value and at least one of a bias bit and a connection bit is under a disable state. The peripheral interface device alternatively enters the first or second power-saving mode when there are more than a first number or a second number of port situation indices determined under the port disable mode. The third input value is a counting value generated in response to a system clock, and the third reference value is a constant value. The third input value is zeroed when the third input value is consistent with the third reference value, and accumulatively updated when the third input value is different from the third reference value. The peripheral interface device includes a plurality of ports, and the first power-saving mode is entered when respective port situation indices of all of the ports are under a port disable mode.

Likewise, a status of a fourth input value can be detected when the third input value is consistent with the third reference value and the peripheral interface device is prohibited from entering any of the first power-saving mode and the second power-saving mode when the fourth input value is in a specified status. The fourth input value is a flag and the specified status is one of a true and a false status.

Another aspect of the present invention relates to a method for enabling a power-saving mode for an electronic apparatus. The electronic apparatus is electrically connected to at least one peripheral device via at least one port of a peripheral interface device. The method comprises steps of: comparing a first input value with a first reference value; determining a plurality of port situation indices in a group to be enabled or disabled in response to a specified comparing result of the first input value and the first reference value; and having the peripheral interface device enter a first power-saving mode when all the port situation indices in the group are in a disable state, and enter a second power-saving mode when there is a certain portion of port situation indices in the group are in an enable state.

In an embodiment one of the port situation indices is determined to be enabled or disabled according to a bias bit and a connection bit when the first input value is consistent with the first reference value. For example, one of the port situation indices is determined to be disabled when at least one of the bias bit and the connection bit are under a disable state, and determined to be enabled when both of the bias bit and the connection bit are under an enable state.

In an embodiment, the method further comprises steps of comparing a third input value with a third reference value when the first input value is different from the first reference value; determining a transmission inactive mode of a transmission index when the third input value is consistent with the third reference value and all transmission-state bits are in a disable state; and having the peripheral interface device alternatively enter the first or second power-saving mode when there are more than a first number or a second number of transmission indices determined under the transmission inactive mode.

BRIEF DESCRIPTION OF THE DRAWINGS

The present invention may best be understood through the following description with reference to the accompanying drawings, in which:

FIGS. 2A-2D are flowcharts illustrating a preferred embodiment of a method for enabling a power-saving mode of a peripheral interface device according to the present invention;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
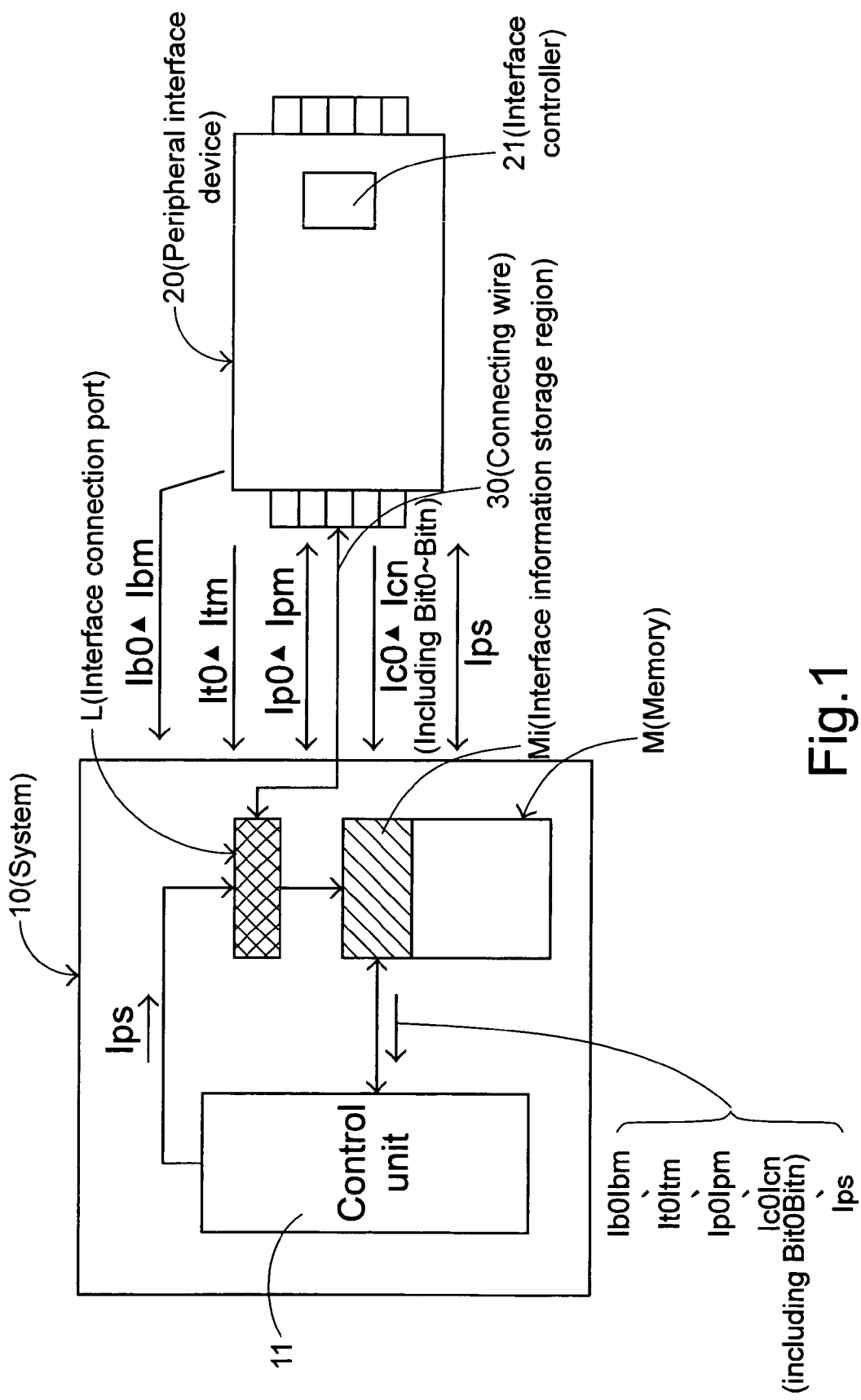
FIG. 1 is a functional block diagram illustrating a preferred embodiment of a method for enabling a power-saving mode of a peripheral interface device according to the present invention.

Please refer to FIG. 1. A system 10 includes an interface connection port L electrically connected to a peripheral interface device 20 via a connecting wire 30. The peripheral interface device 20 includes an interface controller 21 and a plurality of expansion ports (not shown) for connecting to a plurality of the peripheral devices (not shown).

For easily understanding the present invention, an exemplified embodiment is given herein. In this embodiment, the peripheral interface device 20 is an IEEE 1394 peripheral interface card and provides a plurality of transmission modes including an asynchronous request transmit mode, an asynchronous response transmit mode, an asynchronous request receive mode, an asynchronous response receive mode, isochronous transmit modes and isochronous receive modes. For each transmission mode, a context control set register is provided, disposed in the peripheral interface card 20, for storing a corresponding transmission control context. In other words, the interface controller 21 of the peripheral interface card 20 transmits the transmission control contexts Ic0~Icn corresponding to the transmission modes, respectively, into an interface information storage region Mi of a memory M. Each of the transmission control contexts Ic0~Icn includes corresponding transmission-state bits serving as transmission indices Bit0~Bitn, representing the active or inactive transmission states in these transmission modes.

Each of the transmission-state bits can be a disable state or an enable state. When all of the transmission-state bits are in the disable states, the peripheral interface device 20 is determined to be inactive. When at least one of the transmission-state bits is in its enable state, the peripheral interface device 20 is determined to be active.

In addition, the port situation indices Ip0~Ipm, the bias-state bits Ib0~Ibm and the connection-state bits Ip0~Ipm are stored in respective registers of the peripheral interface card 20 and used to determine whether the expansion ports are in disable or enable states.

When the bias-state bit and the connection-state bit are both under enable states, it means the bias and the connection states of the expansion port to the peripheral device is normal. Thus, the port situation index of the expansion port indicates a port enable mode. When the bias-state bit and the connection-state bit are both under disable states, it means the expansion port is not connected to any peripheral device. Thus, the port situation index of the expansion port indicates a port disable mode. When the bias-state bit is under its enable state but the connection-state bit is under its disable state, the connection of the expansion port to the peripheral device is determined to be abnormal. Thus, the port situation index of the expansion port indicates a port disable mode. When the bias-state bit is under its disable state but the connection-state bit is under its enable state, it means the expansion port has an abnormal bias. Thus, the port situation index of the expansion port indicates a port disable mode. The port is disabled in response to a command from the control unit 11, the peripheral interface device 20 or a user.

The power mode index Ips of the peripheral interface card 20 is transmitted to the interface information storage region Mi by the interface controller 21 to be realized by the control unit 11. The control unit 11 changes the power mode index Ips in the interface information storage region Mi according to the transmission indices Bit0~Bitn and the port situation indices Ip0~Ipm. The power mode index Ips indicates one of no special power-saving mode D0, a primary power-saving mode D1, an intermediate power-saving, mode D2 and a highly power-saving mode D3 For example, when the transmission indices Bit0~Bitn are all under inactive states or when all the port situation indices Ip0~Ipm are under port disable states, the power mode index Ips indicates the highly power-saving mode D3. When less transmission indices are under inactive states or when less port situation indices Ip0~Ipm are under port disable states, the power mode index Ips indicates the primary or intermediate power-saving mode D1 or D2.

For further describing the present invention, a method for enabling a power-saving mode of a peripheral interface device according to the present invention is illustrated with reference to the flowcharts of FIGS. 2A-2D. First of all, initial values of a first input value $C_C$, a first reference value $C_{C\_CHK}$, a second input value Flagc, a third input value $C_P$, a third reference value $C_{P\_CHK}$ and a fourth input value Flagp are set up in Step P12. In this embodiment, both of the first and third input values $C_C$ and $C_P$ are counting values, and the first and third reference values $C_{C\_CHK}$ and $C_{P\_CHK}$ are constant values. Both the first and third input values $C_{C\ and\ CP}$, however, can also be interrupt signals generated from the peripheral interface device 20, and the first and third reference values $C_{C\_CHK}$ and $C_{P\_CHK}$ can be the interrupt signals under specific states. The second and fourth input values Flagc and Flagp are flags. While a first state of the flag indicates a true status, a second state of the flag indicates a false status.

In response to a system clock of a system 10, counters work to generate the first and third input values $C_C$ and $C_P$, respectively, referring to Step P13. The control unit 11 uses a timer of a basic input/output system (BIOS) of the system 10 to provide a counting clock for those counters. The counters, which can be disposed in the control unit 11, are up-counting, down-counting or cyclic counters.

In Steps P14 and P15, the first input value $C_c$ is inputted and compared with the first reference value $C_{C\_CHK}$. When the first input value $C_C$ is consistent with, e.g. equal to, the first reference value $C_{C\_CHK}$, go to Steps P16 and P17 to input the second input value Flagc, and determine whether the second input value Flagc is in a true status. Otherwise, go to Step P22 (see FIG. 2C) to monitor port situations. Referring back to Step P17, if the second input value Flagc is in the true status, go to Steps P18 and P19 (see FIG. 2B) to input the transmission indices Bit0~Bitn from the interface information storage region Mi and determine their transmission states. If all of the transmission indices Bit0~Bitn are under inactive states, the control unit 11 changes the power mode index Ips in the interface information storage region Mi, and the interface controller 21 has the peripheral interface device 20 enter the highly power-saving mode D3 (Step P20, FIG. 2B). Otherwise, if the transmission indices Bit0~Bitn are not all under inactive states, the power mode index Ips is variously re-entered by the control unit 11 (Step P34, FIG. 2B). For example, when there are a certain portion (certain count or ratio) of the transmission indices Bit0~Bitn, e.g. 3 counts, remaining in active states, the power mode index Ips is changed to a value indicating the intermediate power-saving mode D2 of the peripheral interface device 20. Further, the peripheral interface device 20 enters a primary power-saving mode D1 in response to the change of power mode index Ips when there is four of the transmission indices Bit0~Bitn remaining in active states. More than four transmission indices Bit0~Bitn remaining in active states correspond to another power mode index value and result in the no power-saving mode D0. After either of the power-saving modes D0, D1, D2 and D3, the first input value Cc is initialized by resetting the associated counter, as indicated by Step P21.

Please go back to Step P17 in FIG. 2A again. If the second input value Flagc is not in the true status, i.e. it is in a false status, go to Steps P30 and P31 where the power index Ips in the interface information storage region Mi is inputted to determine whether the peripheral interface device 20 is in the no power-saving mode D0. If it is, the control unit 11 resets the counter and initializes the first input value $C_C$. On the contrary, if it is not, go to Step P33 where the control unit 11 changes the power index Ips to force the peripheral interface device 20 to enter the no power-saving mode D0, and then resets the counting value $C_C$. It is understood that the input value flagc allows the user to decide whether the power-saving function is to be entered or not.

After the power-saving functions in response to the data transmission states and/or the input value flagc are determined, the counting value $C_C$ is reset, and Step P22 (FIG. 2C) where another input value $C_P$ is inputted is optionally executed. The third input value $C_P$ is compared with the third reference value $C_{P\_CHK}$ in Step P23. If the comparing result indicates that the input value $C_P$ is different from the reference value $C_{P\_CHK}$, the procedure is back to Step P13 (FIG. 2A), counting up/down to generate new input values $C_C$ and $C_P$. On the contrary, if the comparing result indicates that the input value $C_P$ is equal to the reference value $C_{P\_CHK}$, another input value Flagp is inputted and determined whether to be in the true status. When the input value Flagp indicates a false status, go to Step P35 where the port situation indices Ip0~Ipm are inputted and the port situations are determined. If all the port situation indices reveal disable states, the control unit 11 resets the input value $C_P$ in Step P37 and the procedure goes back to Step P13. Otherwise, all the port situation indices Ip0~Ipm are forced to the disable states before the input value $C_P$ is reset and Step P13 is executed. On the other hand, when the input value Flagp indicates the true status in Step P25, the port situation indices Ip0~Ipm are inputted and discriminated to be in enable states or disable states in Step P26. If the port situation indices Ip0~Ipm are all determined to be under the disable states in Step P27, the control unit 11 changes the power mode index Ips, and the interface controller 21 has the peripheral interface device 20 enter the highly power-saving mode D3 (Step P28, FIG. 2D). Otherwise, if the port situation indices Ip0~Ipm are not all under disable states in Step P27, the power mode index Ips is variously re-entered by the control unit 11 (Step P39, FIG. 2D). For example, when there are a certain portion (certain count or ratio) of the port situation indices Ip0~Ipm, e.g. 3 counts, remaining in port enable modes, the power mode index Ips is changed to a value indicating the intermediate power-saving mode D2 of the peripheral interface device 20. Further, the peripheral interface device 20 enters a primary power-saving mode D1 in response to the change of power mode index Ips when there is four of the port situation indices Ip0~Ipm remaining in port enable modes. More than four port situation indices Ip0~Ipm remaining in port enable modes correspond to another power mode index value and result in the no power-saving mode D0. After either of the power-saving modes D0, D1, D2 and D3, the input value $C_P$ is initialized by resetting the associated counter. It is understood that the input value flagp allows the user to decide whether the power-saving function is to be entered or not. After the power-saving functions in response to the port utilization states and/or the input value flagp are determined, the counting value $C_P$ is reset, and Step P13 (FIG. 2A) where new input values $C_C$ and $C_P$ are generated and inputted is executed, thereby continuously monitoring and optimizing the power consumption of the peripheral interface device.

Figure 2B:
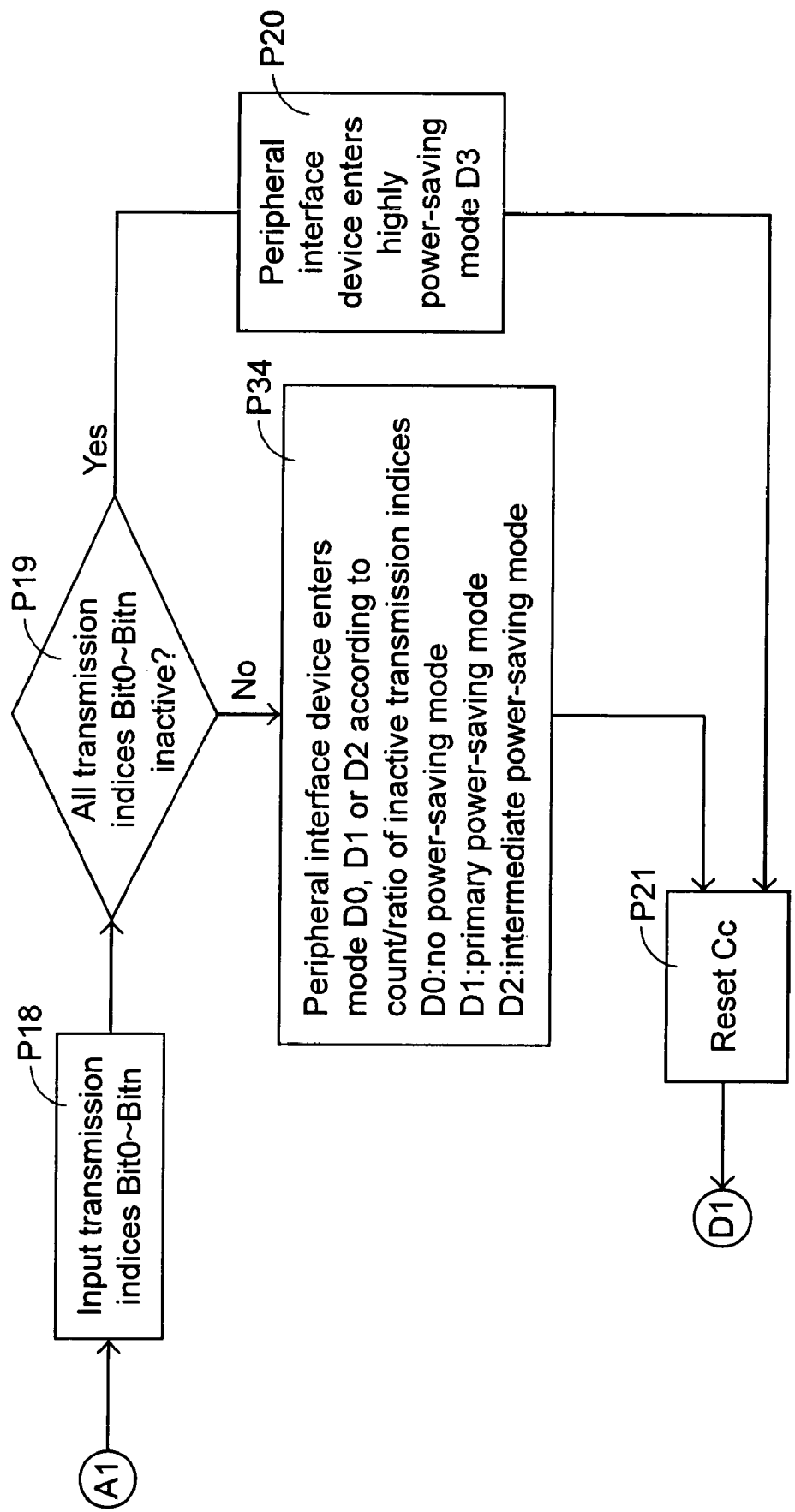
Figure 2C:
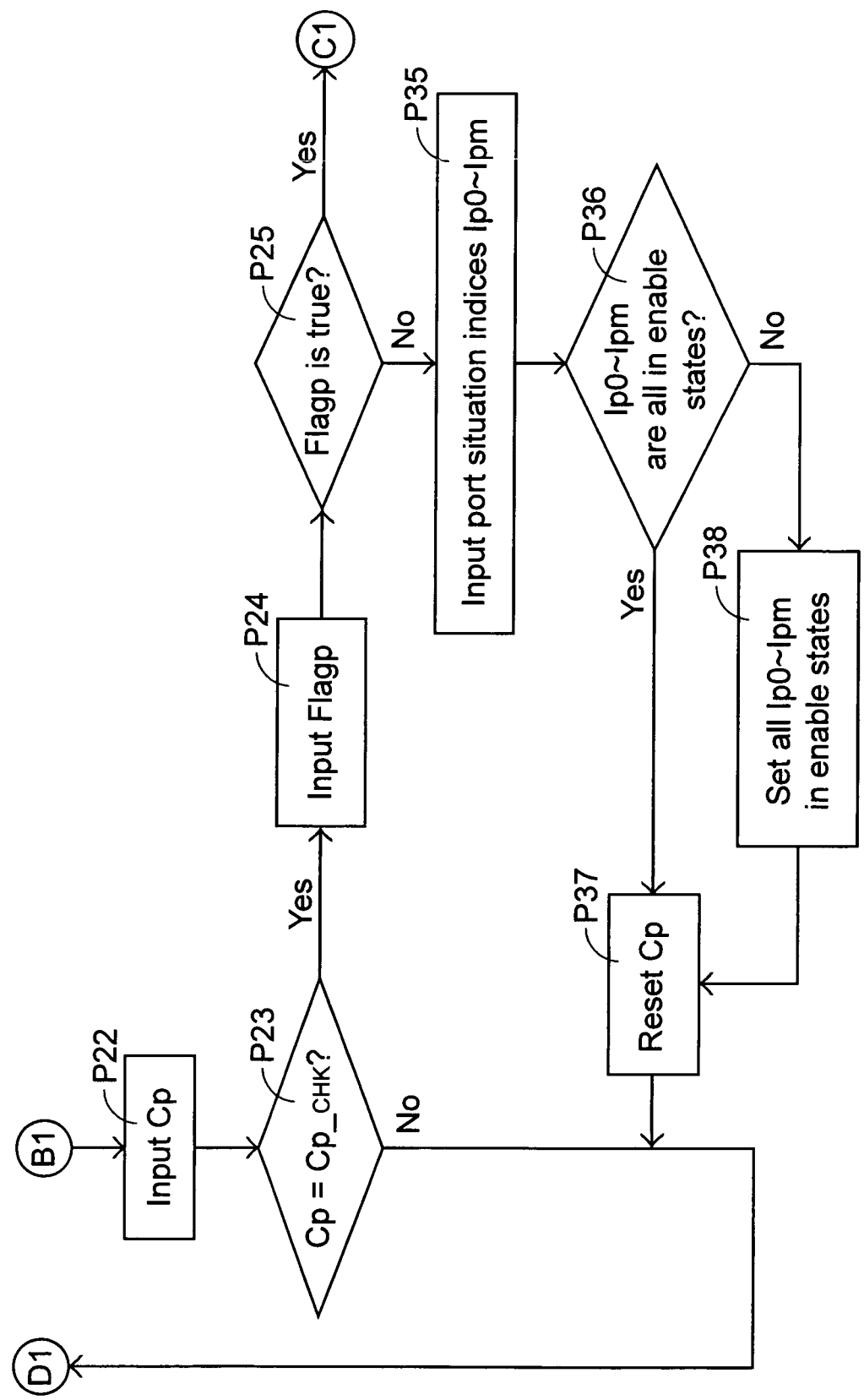
Figure 2D:
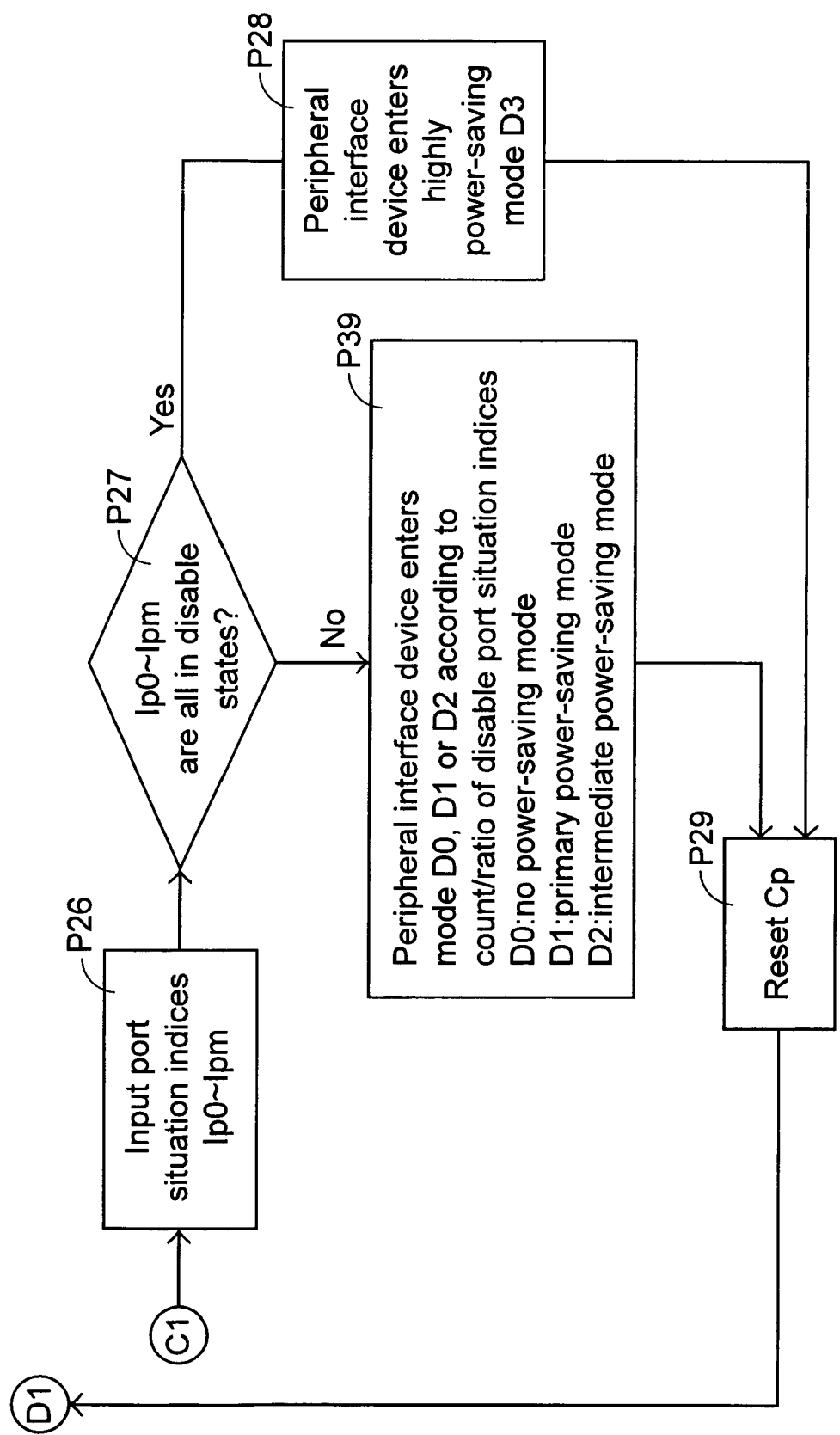
Figure 2E:
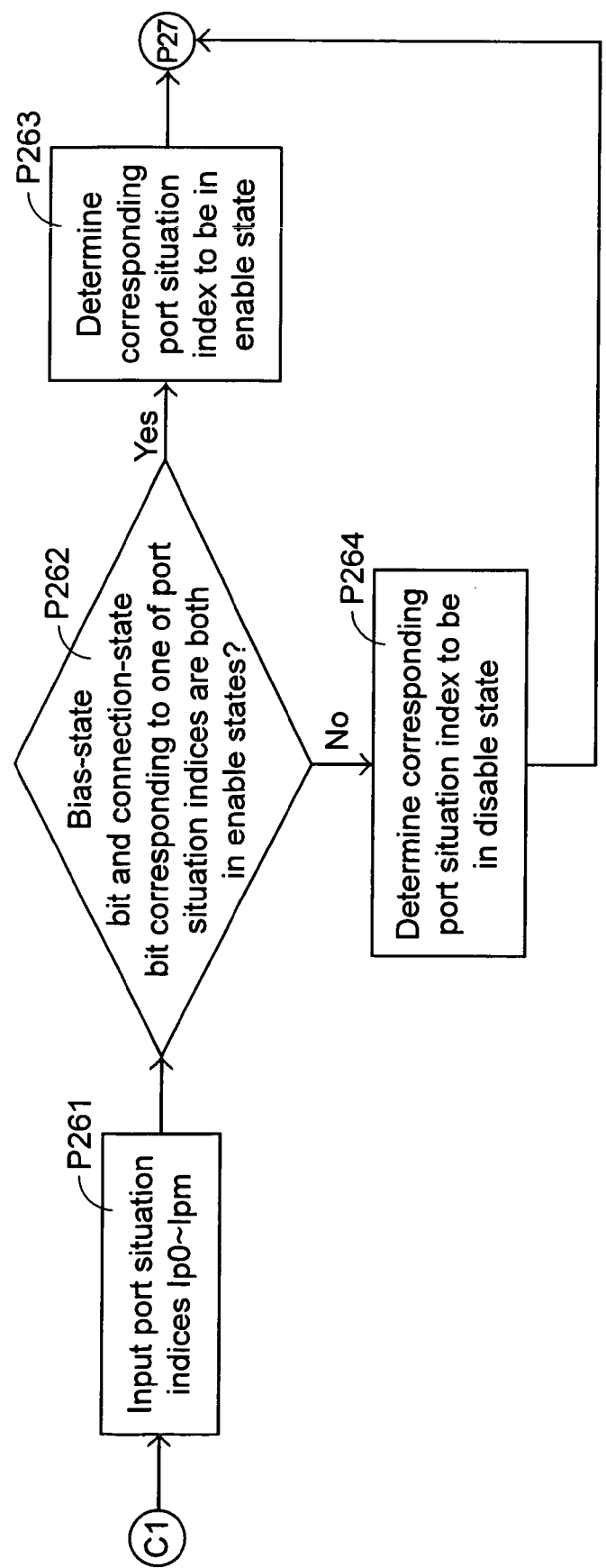
FIG. 2E is a detailed flowchart illustrating the step of P26 in FIG. 2D.

Preferably, the step P26 for discriminating the port situation indices Ip0~Ipm is executed by the sub-steps P261 to P264 as shown in FIG. 2E. First of all, the port situation indices Ip0~Ipm are inputted. Then, the bias-state bit and the connection-state bit corresponding to each of the port situation indices Ip0~Ipm are determined to be in enable or disable states. When the bias-state bit and connection-state bit are both under enable states, which means the bias of the corresponding expansion port of the peripheral interface device 20 is in a normal state and the connection of the expansion port to the peripheral device is perfect, the port situation index associated with the expansion port is discriminated to be under the enable state. Otherwise, the port situation index is discriminated to be under the disable state.

FIGS. 3A-3D are flowcharts illustrating another method for enabling a power-saving mode of a peripheral interface device according to the present invention. In this method, the port situation is detected prior to the transmission state.

First of all, initial values of a first input value $C_P$, a first reference value $C_{P\_CHK}$, a second input value Flagp, a third input value $C_C$, a third reference value $C_{C\_CHK}$ and a fourth input value Flagc are set up in Step E12. In this embodiment, both of the first and third input values $C_P$ and $C_C$ are counting values, and the first and third reference values $C_{P\_CHK}$ and $C_{C\_CHK}$ are constant values. Both the first and third input values $C_P$ and $C_C$, however, can also be interrupt signals generated from the peripheral interface device 20, and the first and third reference values $C_{P\_CHK}$ and $C_{C\_CHK}$ can be the interrupt signals under specific states. The second and fourth input values Flagp and Flagc are flags. While a first state of the flag indicates a true status, a second state of the flag indicates a false status.

In response to a system clock of a system 10, counters work to generate the first and third input values $C_P$ and $C_C$, respectively, referring to Step E13. In Steps E14 and E15, the first input value $C_P$ is inputted and compared with the first reference value $C_{P\_CHK}$. If the first input value $C_P$ is equal to the first reference value $C_{P\_CHK}$, go to Steps E16 and E17 to input the second input value Flagp, and determine whether the second input value Flagp is true or not. Otherwise, go to Step E22 (see FIG. 3C) to monitor transmission states. Referring back to Step E17, if the second input value Flagp is true, go to Steps E18 and E19 (see FIG. 3B) to input the port situation indices Ip0~Ipm from the interface information storage region Mi and determine their port states. If all of the port situation indices Ip0~Ipm indicate port disable modes, the control unit 11 changes the power mode index Ips in the interface information storage region Mi, and the interface controller 21 has the peripheral interface device 20 enter the highly power-saving mode D3 (Step E20, FIG. 3B). Otherwise, the power mode index Ips is variously re-entered by the control unit 11 (Step E34, FIG. 3B). For example, when there are three of the port situation indices Ip0~Ipm remaining in port enable modes, the power mode index Ips is changed to a value indicating the intermediate power-saving mode D2 of the peripheral interface device 20. Further, the peripheral interface device 20 enters a primary power-saving mode D1 in response to the change of power mode index Ips when there is four of the port situation indices Ip0~Ipm remaining in port enable modes. More than four port situation indices Ip0~Ipm remaining in port enable modes correspond to another power mode index value and result in the no power-saving mode D0. After either of the power-saving modes D0, D1, D2 and D3, the first input value $C_P$ is initialized by resetting the associated counter, as indicated by Step E21.

Please go back to Step E17 in FIG. 3A again. If the second input value Flagp is not true, i.e. it is false, go to Steps E30 and E31 to monitor the port situation indices Ip0~Ipm. If the port situation indices Ip0~Ipm are all in enable states, the control unit 11 resets the counter and initializes the first input value $C_P$. On the contrary, if the port situation indices Ip0~Ipm are not all in enable states, go to Step E33 to force the peripheral interface device to enter the no power-saving mode D0, and then resets the counting value $C_P$. It is understood that the input value flagp allows the user to decide whether the power-saving function is to be entered or not.

After the power-saving functions in response to the port situations and/or the input value flagp are determined, the counting value $C_P$ is reset, and Step E22 (FIG. 3C) where another input value $C_C$ is inputted is executed. The third input value $C_C$ is compared with the third reference value $C_{C\_CHK}$ in Step E23. If the comparing result indicates that the input value $C_P$ is different from the reference value $C_{P\_CHK}$, the procedure is back to Step E13 (FIG. 3A), i.e. counting up/down to generate new input values $C_C$ and $C_P$. On the contrary, if the comparing result indicates that the input value $C_C$ is equal to the reference value $C_{C\_CHK}$, another input value Flagc is inputted and determined whether to be true. When the input value Flagc indicates a false status, go to Step E35 where the power index Ips in the interface information storage region Mi is inputted to determine whether the peripheral interface device 20 is in the no power-saving mode D0. If it is, the control unit 11 resets the counter and initializes the input value $C_C$. On the contrary, if it is not, go to Step E38 where the control unit 11 changes the power index Ips to force the peripheral interface device 20 to enter the no power-saving mode D0, and then resets the counting value $C_C$. On the other hand, when the input value Flagc indicates the true status in Step E25, the transmission indices Bit0~Bitn are inputted and discriminated to be active or inactive in Step E26. If the transmission indices Bit0~Bitn are all determined to be under the inactive states in Step E27, the control unit 11 changes the power mode index Ips, and the interface controller 21 has the peripheral interface device 20 enter the highly power-saving mode D3 (Step E28, FIG. 3D). Otherwise, if the transmission indices Bit0~Bitn are not all under inactive states in Step E27, the power mode index Ips is variously re-entered by the control unit 11 (Step E39, FIG. 3D). For example, when there are three of the transmission indices Bit0~Bitn remaining in active states, the power mode index Ips is changed to a value indicating the intermediate power-saving mode D2 of the peripheral interface device 20. Further, the peripheral interface device 20 enters a primary power-saving mode D1 in response to the change of power mode index Ips when there is four of the transmission indices Bit0~Bitn remaining in active states. More than four transmission indices Bit0~Bitn remaining in active states correspond to another power mode index value and result in the no power-saving mode D0. After either of the power-saving modes D0, D1, D2 and D3, the input value $C_C$ is initialized by resetting the associated counter. It is understood that the input value flagc allows the user to decide whether the power-saving function is to be entered or not. After the power-saving functions in response to the transmission indices Bit0~Bitn and/or the input value flagp are determined, the counting value $C_C$ is reset, and Step E13 (FIG. 3A) where new input values $C_P$ and $C_C$ are generated and inputted is executed, thereby continuously monitoring and optimizing the power consumption of the peripheral interface device.

Figure 3A:
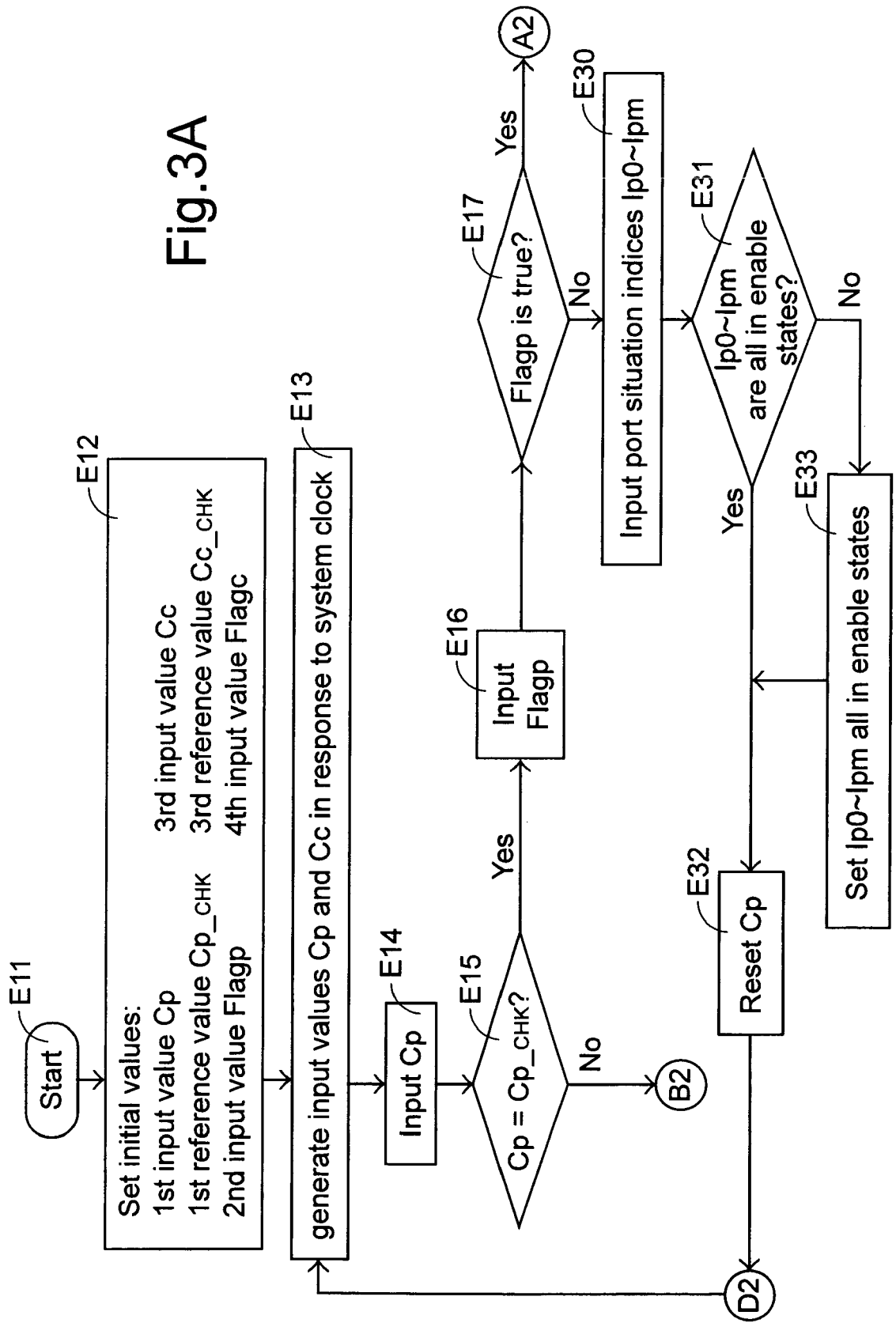
FIGS. 3A-3D are flowcharts illustrating another preferred embodiment of a method for enabling a power-saving mode of a peripheral interface device according to the present invention.
Figure 3B:
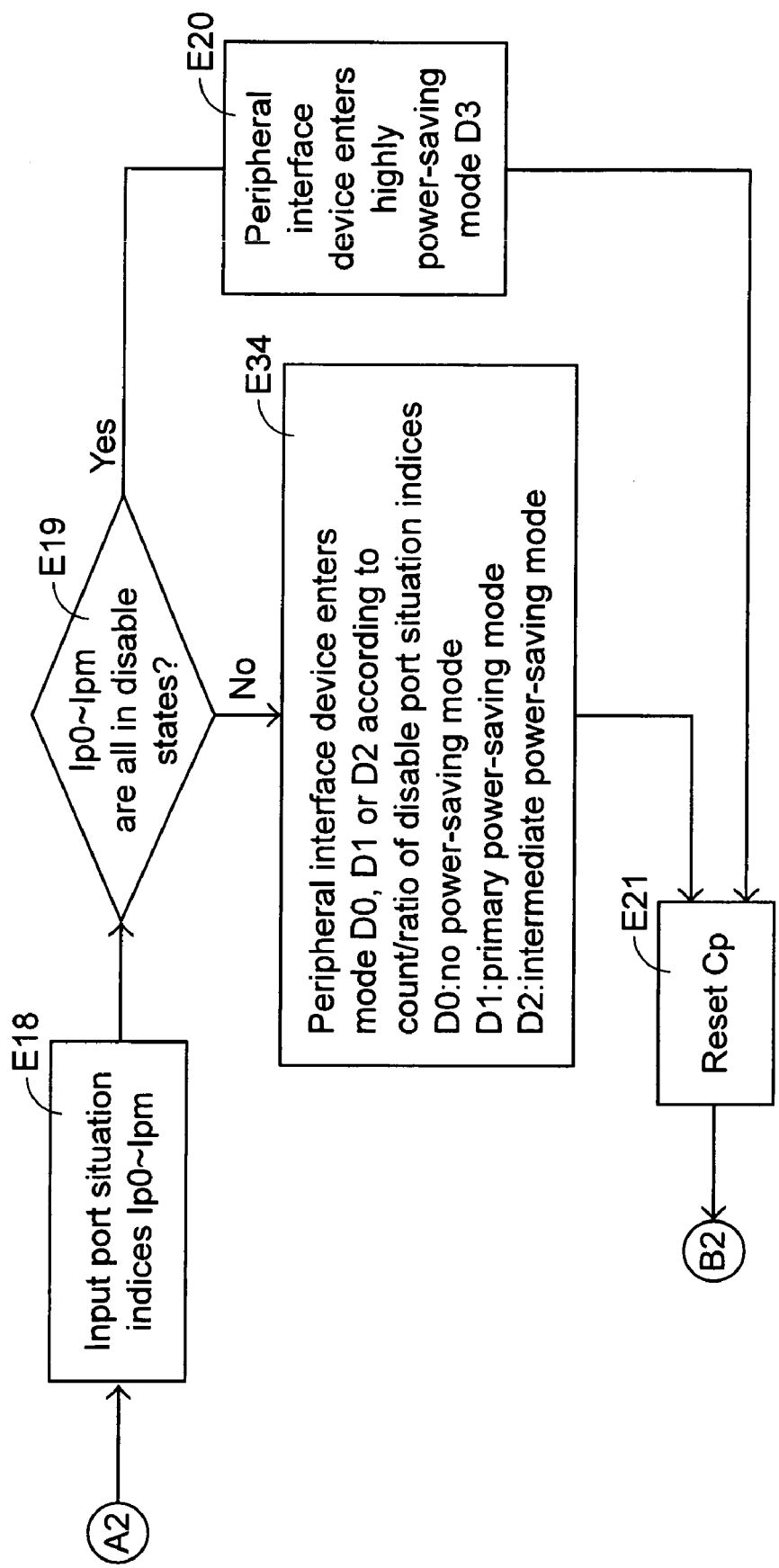
Figure 3C:
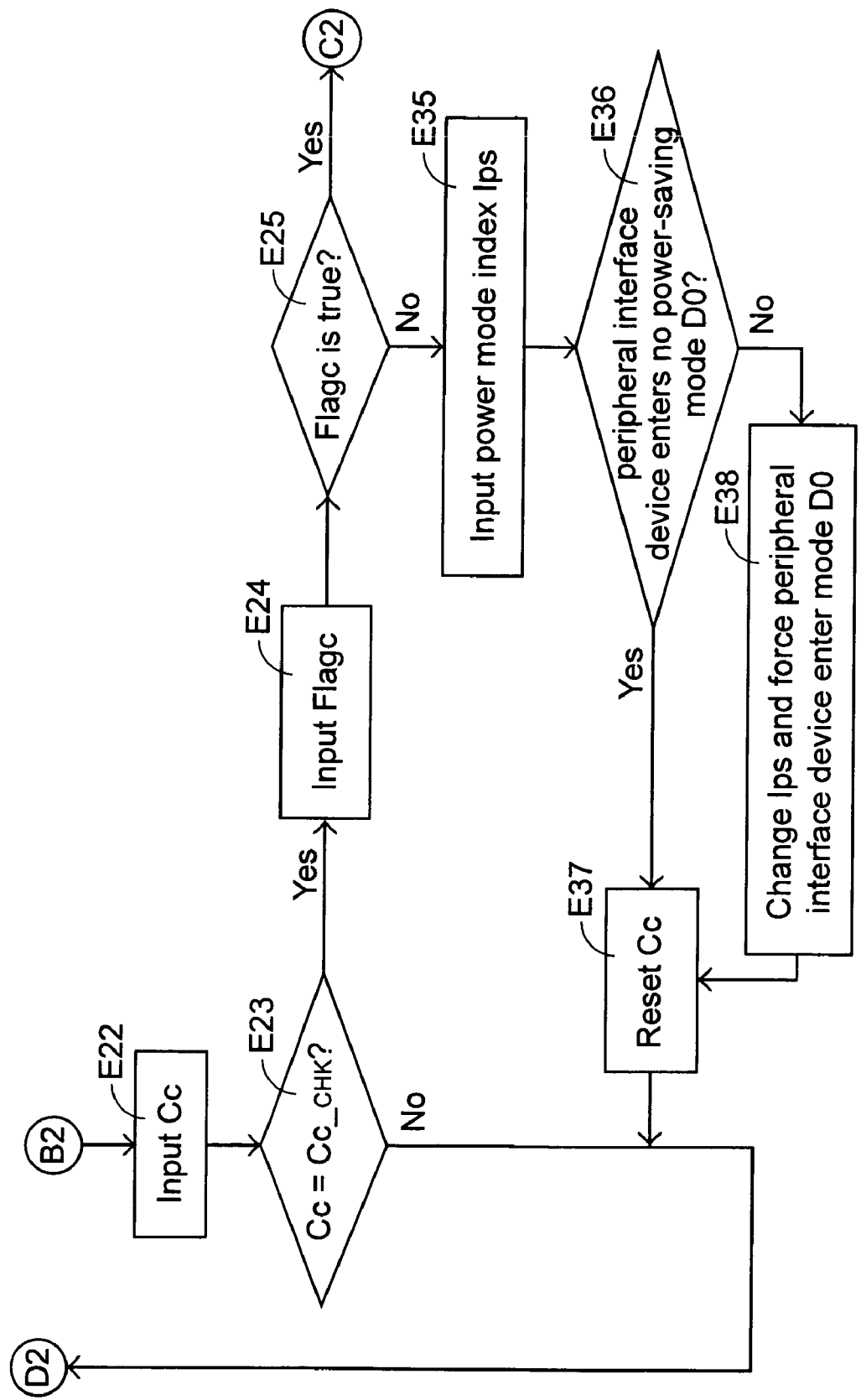
Figure 3D:
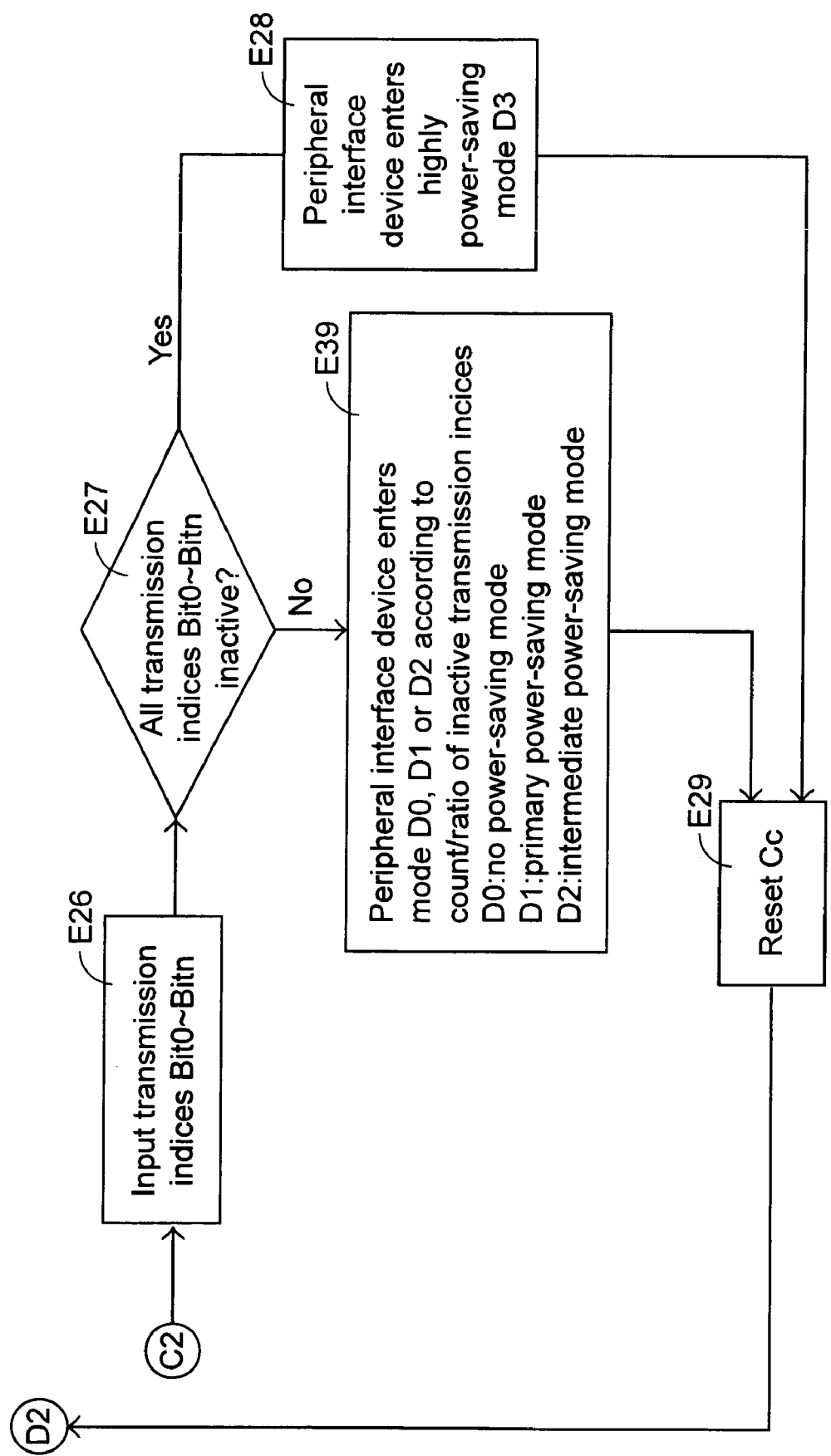
Figure 3E:
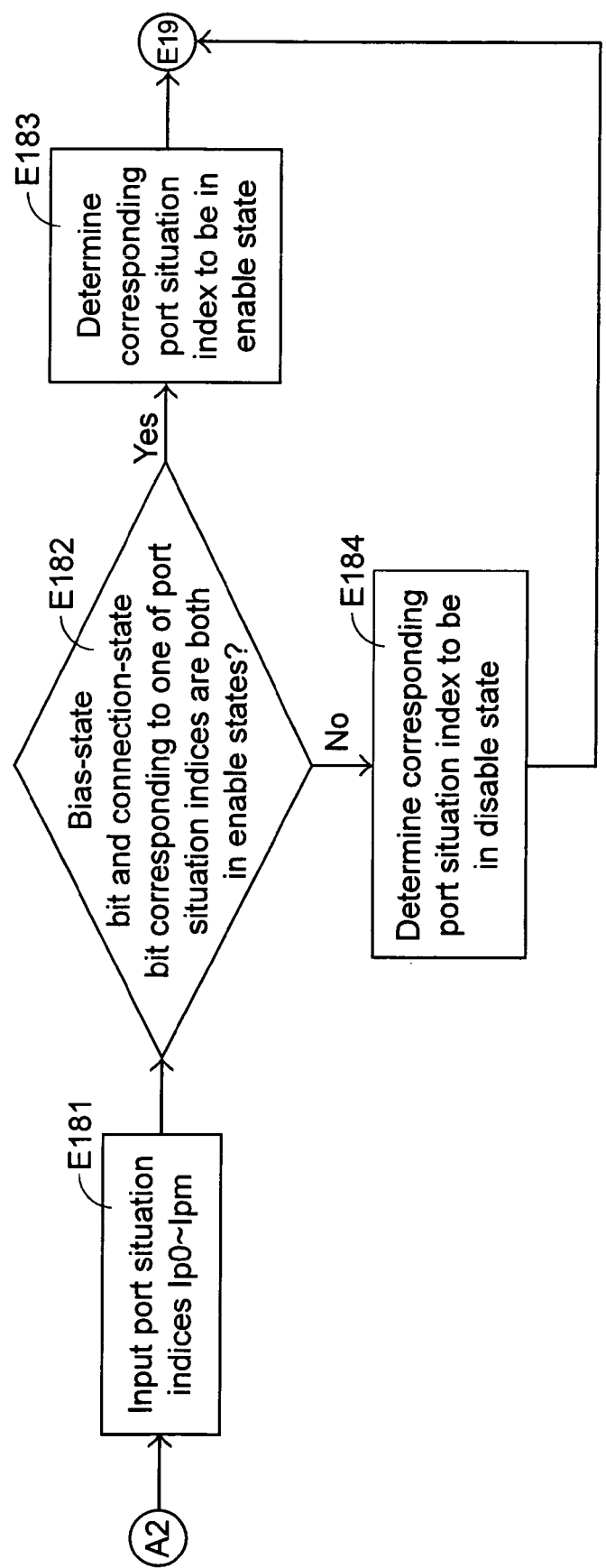
FIG. 3E is a detail flowchart illustrating the step of E18 in FIG. 3B.

Preferably, the step E18 for discriminating the port situation indices Ip0~Ipm is executed by the sub-steps E181 to E184 as shown in FIG. 3E. First of all, the port situation indices Ip0~Ipm are inputted. Then, the bias-state bit and the connection-state bit corresponding to each of the port situation indices Ip0~Ipm are determined to be in enable or disable states. When the bias-state bit and connection-state bit are both under enable states, which means the bias of the corresponding expansion port of the peripheral interface device 20 is in a normal state and the connection of the expansion port to the peripheral device is perfect, the port situation index associated with the expansion port is discriminated to be under the enable state (port enable mode). Otherwise, the port situation index is discriminated to be under the disable state (port disable mode).

To sum up, the method for enabling the power-saving mode according to the present invention dynamically detecting the data transmission states of the peripheral interface device 20 and/or the utility situations of the expansion ports. Accordingly, the power status of the system 10 can be dynamically adjusted, thereby minimizing the power consumption. The power-saving function is especially important for a portable computer or a cell phone which relies on battery to work.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for enabling a power-saving mode for an electronic apparatus, said electronic apparatus including a peripheral interface device for optionally connecting thereto at least one peripheral device, said method comprising steps of:
   determining each of a plurality of transmission indices corresponding to a plurality of transmission modes, respectively, to indicate an active or inactive transmission state when time is counted up to a first preset value; and
   having said peripheral interface device enter a first power-saving mode when all of said transmission indices indicate said inactive transmission state, and enter a second power-saving mode when there is a certain number of said transmission indices indicate said active transmission state.

2. The method according to claim 1 wherein one of said transmission indices is determined by a transmission-state bit and indicates an inactive transmission state if said transmission-state bit is in a disable state.

3. The method according to claim 1 wherein said plurality of transmission modes include asynchronous request transmit mode, asynchronous response transmit mode, asynchronous request receive mode, asynchronous response receive mode, isochronous transmit mode and isochronous receive mode.

4. The method according to claim 1 further comprising a step of resetting time and counting over when said peripheral interface device enters said first or second power-saving mode.

5. The method according to claim 1 further comprising steps of:
   detecting a status of a first flag when time is counted up to said first preset value; and
   prohibiting said peripheral interface device from entering any of said first power-saving mode and said second power-saving mode if said first flag is in a false status.

6. The method according to claim 1 wherein the peripheral interface device includes a plurality of expansion ports, each for optionally connecting thereto a peripheral device, and the method further comprises steps of:
   determining each of a plurality of port situation indices corresponding to said expansion ports, respectively, to indicate an active or inactive port state when time is counted up to a second preset value, wherein one of said port situation indices is determined by a bias bit and a connection bit and indicates an inactive port state if determining a port disable mode of a port situation index when said third input value is consistent with said third reference value and at least one of a said bias bit and a said connection bit is under in a disable state; and
   having said peripheral interface device enter said first power-saving mode when all of said port situation indices indicate said inactive port state, and having said peripheral interface device enter said second power-saving mode when a certain number of port situation indices mode indicate said inactive port state.

7. The method according to claim 6 further comprising a step of resetting time and counting over when said peripheral interface device enters said first or second power-saving mode.

8. The method according to claim 6 further comprising steps of:
   detecting a status of a second flag when time is counted up to said second preset value; and
   prohibiting said peripheral interface device from entering any of said first power-saving mode and said second power-saving mode when said second flag is in a false status.

9. A method for enabling a power-saving mode for an electronic apparatus, said electronic apparatus including a peripheral interface device having a plurality of expansion ports for optionally connecting thereto a plurality of peripheral devices, said method comprising steps of:
   determining each of a plurality of port situation indices corresponding to said expansion ports, respectively, to indicate an active or inactive port state when time is counted up to a second preset value said first input value and said first reference value; and
   having said peripheral interface device enter a first power-saving mode when all of said port situation indices indicate said inactive port state, and enter a second power-saving mode when there is a certain number of port situation indices indicate said active port state.

10. The method according to claim 9 wherein one of said port situation indices is determined by a bias bit and a connection bit and indicates an inactive port state if at least one of said bias bit and said connection bit is in a disable state.

11. The method according to claim 9 further comprising steps of:
   detecting a status of a second flag when time is counted up to said second preset value; and
   prohibiting said peripheral interface device from entering any of said first power-saving mode and said second power-saving mode if said second flag is in a false status.

12. The method according to claim 9 further comprising steps of:
   determining each of a plurality of transmission indices corresponding to a plurality of transmission modes, respectively, to indicate an active or inactive transmission state when time is counted up to a first preset value, wherein one of said transmission indices is determined by a transmission-state bit and indicates an inactive transmission state if said transmission-state bit is in a disable state; and
   having said peripheral interface device enter said first power-saving mode when all of said transmission indices indicate said inactive transmission state, and having said peripheral interface device enter said second power-saving mode when a certain number of transmission indices indicate said inactive transmission state.

13. The method according to claim 12 further comprising steps of:
   detecting a status of a first flag value when time is counted up to said first preset; and
   prohibiting said peripheral interface device from entering any of said first power-saving mode and said second power-saving mode if said first flag is in a false status.

* * * * *

UNITED STATES PATENT AND TRADEMARK OFFICE
CERTIFICATE OF CORRECTION

PATENT NO.        : 7,467,315 B2                                        Page 1 of 1
APPLICATION NO.   : 11/270810
DATED             : December 16, 2008
INVENTOR(S)       : Yu-Wei Chang It is certified that error appears in the above-identified patent and that said Letters Patent is hereby corrected as shown below:

IN THE CLAIMS:
Column 9, lines 53-55, delete "determining a port disable mode of a port situation index when said third input value is consistent with said third reference value and";
Column 9, line 56, delete "under".
Column 10, lines 21-22, delete "said first input value and said first reference value";
Column 10, line 57, delete "value";
Column 10, line 58, "preset" should be changed to --preset value--.

Signed and Sealed this

Twenty-ninth Day of June, 2010

David J. Kappos
*Director of the United States Patent and Trademark Office*